US007665069B2

(12) United States Patent
Weber

(10) Patent No.: US 7,665,069 B2
(45) Date of Patent: Feb. 16, 2010

(54) METHOD AND APPARATUS FOR ESTABLISHING A QUALITY OF SERVICE MODEL

(75) Inventor: Wolf-Dietrich Weber, San Jose, CA (US)

(73) Assignee: Sonics, Inc., Milpitas, CA (US)

( * ) Notice: Subject to any disclaimer, the term of this patent is extended or adjusted under 35 U.S.C. 154(b) by 1546 days.

(21) Appl. No.: 10/698,905

(22) Filed: Oct. 31, 2003

(65) Prior Publication Data

US 2005/0096970 A1 May 5, 2005

(51) Int. Cl.
*G06F 9/44* (2006.01)
*G06F 15/173* (2006.01)
*H04L 12/28* (2006.01)
*G06F 13/00* (2006.01)

(52) U.S. Cl. .................. 717/127; 709/223; 370/395.21; 711/169

(58) Field of Classification Search ........................ None
See application file for complete search history.

(56) References Cited

U.S. PATENT DOCUMENTS

| | | | |
|---|---|---|---|
| 4,393,470 A * | 7/1983 | Miard | 710/15 |
| 4,476,498 A * | 10/1984 | Sheean | 386/26 |
| 4,688,188 A | 8/1987 | Washington | |
| 5,107,257 A | 4/1992 | Fukuda | |
| 5,218,456 A | 6/1993 | Stegbauer et al. | |
| 5,265,257 A | 11/1993 | Simcoe et al. | |
| 5,274,769 A | 12/1993 | Ishida | |
| 5,287,464 A | 2/1994 | Kumar et al. | |
| 5,363,484 A | 11/1994 | Desnoyers et al. | |
| 5,379,379 A | 1/1995 | Becker et al. | |
| 5,440,752 A * | 8/1995 | Lentz et al. | 710/123 |
| 5,469,433 A | 11/1995 | McAuley | |
| 5,469,473 A | 11/1995 | McClear et al. | |
| 5,530,901 A | 6/1996 | Nitta | |
| 5,546,546 A | 8/1996 | Bell et al. | |
| 5,557,754 A | 9/1996 | Stone et al. | |
| 5,634,006 A | 5/1997 | Baugher et al. | |

(Continued)

FOREIGN PATENT DOCUMENTS

EP 02 70 7854 11/2004

(Continued)

OTHER PUBLICATIONS de Meer, H.; Richter, J.-P.; Puliafito, A.; Tomarchio, O., "Tunnel agents for enhanced Internet QoS," Concurrency, IEEE, vol. 6, No. 2, pp. 30-39, Apr.-Jun. 1998, URL: http://ieeexplore.ieee.org/stamp/stamp.jsp?arnumber=678787&isnumber=14923.*

(Continued)

*Primary Examiner*—James Rutten
(74) *Attorney, Agent, or Firm*—Rutan & Tucker LLP

(57) ABSTRACT

In general, methods and apparatus for implementing a Quality of Service (QoS) model are disclosed. A Quality of Service (QoS) contract with an initiating network device may be satisfied. A request may be received from the initiating network device in a first time less than or equal to an ordinal number times an arrival interval. The ordinal number signifies a position of the request among a group of requests. The request that has been serviced may be returned to the initiator in a second time less than or equal to a constant term plus the ordinal number times a service interval.

27 Claims, 8 Drawing Sheets

U.S. PATENT DOCUMENTS

| | | |
|---|---|---|
| 5,664,153 A | 9/1997 | Farrell |
| 5,673,416 A | 9/1997 | Chee et al. |
| 5,745,913 A | 4/1998 | Pattin et al. |
| 5,748,629 A | 5/1998 | Caldara et al. |
| 5,809,538 A | 9/1998 | Pollmann et al. |
| 5,917,804 A | 6/1999 | Shah et al. |
| 5,926,649 A | 7/1999 | Ma et al. |
| 5,948,089 A | 9/1999 | Wingard et al. |
| 5,982,780 A | 11/1999 | Bohm et al. |
| 5,996,037 A | 11/1999 | Emnett |
| 6,023,720 A | 2/2000 | Aref et al. |
| 6,092,137 A | 7/2000 | Huang et al. |
| 6,104,690 A | 8/2000 | Feldman et al. |
| 6,105,094 A * | 8/2000 | Lindeman .................. 710/107 |
| 6,119,183 A | 9/2000 | Briel et al. |
| 6,122,690 A | 9/2000 | Nannetti et al. |
| 6,141,355 A | 10/2000 | Palmer et al. |
| 6,141,713 A | 10/2000 | Kang |
| 6,167,445 A | 12/2000 | Gai et al. |
| 6,198,724 B1 | 3/2001 | Lam et al. |
| 6,199,131 B1 | 3/2001 | Melo et al. |
| 6,212,611 B1 | 4/2001 | Nizar et al. |
| 6,215,789 B1 | 4/2001 | Keenan et al. |
| 6,215,797 B1 | 4/2001 | Fellman et al. |
| 6,253,269 B1 | 6/2001 | Cranston et al. |
| 6,266,718 B1 | 7/2001 | Klein |
| 6,330,225 B1 | 12/2001 | Weber et al. |
| 6,335,932 B2 | 1/2002 | Kadambi et al. |
| 6,363,445 B1 | 3/2002 | Jeddeloh |
| 6,430,156 B1 | 8/2002 | Park et al. |
| 6,499,090 B1 | 12/2002 | Hill et al. |
| 6,510,497 B1 | 1/2003 | Strongin et al. |
| 6,530,007 B2 | 3/2003 | Olarig et al. |
| 6,578,117 B2 | 6/2003 | Weber |
| 6,628,609 B2 | 9/2003 | Chapman et al. |
| 6,636,482 B2 | 10/2003 | Cloonan et al. |
| 6,721,325 B1 | 4/2004 | Duckering et al. |
| 6,804,738 B2 | 10/2004 | Weber |
| 6,804,757 B2 | 10/2004 | Weber |
| 6,862,265 B1 | 3/2005 | Appala et al. |
| 6,880,133 B2 | 4/2005 | Meyer et al. |
| 6,976,106 B2 | 12/2005 | Tomlinson et al. |
| 7,149,829 B2 | 12/2006 | Weber et al. |
| 7,191,273 B2 | 3/2007 | Weber |
| 7,194,561 B2 | 3/2007 | Weber |
| 7,254,603 B2 | 8/2007 | Weber et al. |
| 7,277,975 B2 | 10/2007 | Vinogradov et al. |
| 7,296,105 B2 | 11/2007 | Weber et al. |
| 7,299,155 B2 | 11/2007 | Ebert et al. |
| 7,302,691 B2 | 11/2007 | Masri et al. |
| 7,325,221 B1 | 1/2008 | Wingard et al. |
| 7,356,633 B2 | 4/2008 | Weber et al. |
| 2001/0026535 A1 | 10/2001 | Amou et al. |
| 2002/0038397 A1* | 3/2002 | Singh et al. .................. 710/105 |
| 2002/0129173 A1 | 9/2002 | Weber et al. |
| 2002/0138687 A1 | 9/2002 | Yang et al. |
| 2002/0152297 A1* | 10/2002 | Lebourg et al. ............. 709/223 |
| 2002/0174227 A1 | 11/2002 | Hartsell et al. |
| 2003/0074519 A1 | 4/2003 | Weber |
| 2003/0079080 A1 | 4/2003 | DeMoney |

FOREIGN PATENT DOCUMENTS

| | | |
|---|---|---|
| JP | H11-250004 | 9/1999 |
| JP | 2000-250853 | 9/2000 |
| WO | WO 00/29956 A | 5/2000 |
| WO | WO 01/75620 A | 10/2001 |
| WO | WO 01/93477 A1 | 12/2001 |
| WO | WO 03/034242 | 4/2003 |
| WO | WO 2005/045727 | 5/2005 |

OTHER PUBLICATIONS

Melvin, S. and Patt, Y. 2002. Handling of packet dependencies: a critical issue for highly parallel network processors. In Proceedings of the 2002 international Conference on Compilers, Architecture, and Synthesis For Embedded Systems (Grenoble, France, Oct. 8-11, 2002). Cases '02. ACM, New York, NY, 202-209.*

Wolf-Dietrich Weber, et al., "*A quality-of-service mechanism for interconnection networks inn system-on-chips*", IEEE 2005, 6 pages.

Drew Wingard, "*MicroNetworks-Based Integration for SOCs.*" In Design Automation Conference, 2001, pp. 673-677, 5 pages.

Paul Wielage, et al., "*Networks on Silicon: Blessing or Nightmare?*" Keynote speech, Proceedings of the Euromicro Symposium on Digital System Design, Dortmund, Germany, Sep. 2002, 5 pages.

Ron Ho, et al., "*The Future of Wires*". In Proceedings of the IEEE, vol. 89, No. 4, pp. 490-504, Apr. 2001, 15 pages.

William J. Dally, et al., "*Route Packets, Not Wires: On-Chip Interconnection Networks.*" In Design Automation Conference, pp. 684-689, Jun. 2001, 6 pages.

Luca Benini, et al., "*Networks on Chips: A New SoC Paradigm*", In IEEE 2002, Computer, vol. 35, No. 1, pp. 70-78, 9 pages.

Jim Kurose, "*Open Issues and Challenges in Providing Quality of Service Guarantees in High-Speed Networks*", ACM Computer Communication Review, vol. 23, No. 1, pp. 6-15, Jan. 1993, 10 pages.

Martin Reisslein et al., "*A Framework for Guaranteeing Statistical QoS*", In IEEE/ACM Transactions on Networking, vol. 10, No. 1, Feb. 2002, pp. 27-42, 16 pages.

Hui Zhang, "*Service Disciplines for Guaranteed Performance Service in Packet-Switching Networks*", Proceedings of the IEEE, vol. 83, No. 10, Oct. 1995, pp. 1374-1396, 23 pages.

Dimitrios Stiliadis, et al., "*Latency-Rate Servers: A General Model for Analysis of Traffic Scheduling Algorithms*", In Proceedings of IEEE Infocom 96, Apr. 1996, pp. 111-119, 9 pages.

K. Goossens, et al., "*Networks on Silicon: Combining Best-Effort and Guaranteed Services*", In Proceeding of 2002 Design, 3 pages.

E. Rijpkema, et al., "*Trade Offs in the Design of a Router with Both Guaranteed and Best-Effort Services for Networks on Chip*", In Proceedings of Design Automation and Test Conference in Europe, Mar. 2003, 6 pages.

K. Lahiri, et al., "*LOTTERYBUS: A New High-Performance Communication Architecture for System-on-Chip Designs*". In Proceedings of Design Automation Conference 2003, Las Vegas, Jun. 2001, pp. 15-20, 6 pages.

William J. Dally, "*Virtual-channel Flow Control*", In Proceedings of the 17th Int. Symp. on Computer Architecture, ACM SIGARCH, May 1990, vol. 18, No. 2, pp. 60-68, 9 pages.

Drew Wingard, et al., "*Integration Architecture for System-on-a-Chip Design*", In Proc. of the 1998 Custom Integrated Circuits Conference, May 1998, pp. 85-88, 4 pages.

Axel Jantsch, et al., "*Networks on Chip*", Kluwer Academic Publishers, 2003. Cover, Title Page, Contents, (4 pp.) Chapters 1-5, (pp. 3-106,) Chapters 7-8, (pp. 131-172) & Chapter10, (pp. 193-213), 171 pages.

Weber, Wolf-Dietrich, et al., "Enabling Reuse via an IP Core-centric Communications Protocol: Open Core Protocol", In Proceedings of the IP 2000 System-on-Chip Conference Mar. 2000, pp. 1-5.

Communication relating to the results of the Partial International Search, PCT/US2004/035863, mailing date Jun. 9, 2005, pp. 1 total.

Adan et al., "Queueing Models and some Fundamental Relations", Chapter 3, XP-002329104, Feb. 14, 2001, pp. 23-27 (double-sided copy).

Leslie Lamport, "How to Make a Multiprocessor Computer that Correctly Executes Multiprocess Programs", XP-009029909, IEEE Transactions on Computers, vol. C-28, No. 9, Sep. 1979, pp. 690-691 (double-sided copy).

Rixner, Scott et al., "*Memory Access Scheduling*", to appear in ISCA-27 (2000), Computer Systems Laboratory, Stanford University, Stanford, CA 94305 pp. 1-11.

Rixner, et al., "*A Bandwidth-Efficient Architecture for Media Processing*", Micro-31, (1998), pp. 1-11.

Search Report for PCT/US02/05288, mailed May 20, 2002, 1 page.

Search Report for PCT/US02/05438, mailed May 24, 2002, 1 page.
Search Report for PCT/US02/05439, mailed Jun. 26, 2002, 1 page.
Search Report for PCT/US02/05287, mailed Jul. 11, 2002, 1 page.
Wingard, Drew, "Sonics SOC Integration Architecture," Sonics, Inc., 1500 presentation, 1999, 25 pages, www.00P-IP.org. Kamas, Alan, "The SystemC OCP Models; An Overview of the SystemC Models for the Open Core Protocol," NASCUG, 2004, 30 pages.
Wingard, Drew, "Socket-Based Design Using Decoupled Interconnects," Sonics, Inc., 30 pages, downloaded Jun. 14, 2004, www.OCP-IP.org.
Wingard, Drew, "Tiles-An Architectural Abstraction for Platform-Based Design," Perspective article 2, EDA Vision, Jun. 2002, 3 pages, www.edavision.com.
Weber, Wolf-Dietrich, "Efficient Shared DRAM Subsystems for SOCs," Sonics, Inc., 2001, 6 pages.
"Open Core Protocol Specification," OCP International Partnership, Release 1.0, 2001, 2 pgs.
Wingard, Drew PhD., "Integrating Semiconductor IP Using uNetworks," ASIC Design, Jul. 2000 electronic engineering, 3 pages.
Wingard, Drew, "Tiles: the Heterogeneous Processing Abstraction for MPSoC," Sonics, Inc., Smart Interconnect IP, 2004, 35 pages, www.00P-IP.org.

Chou, Joe, "System-Level Design Using OCP Based Transaction-Level Models," presentation, Denali MemCom Taiwan 2005, OCP International Partnership, 23 pages.
Wingard, Drew, "A Non-Blocking Intelligent Interconnect for AMBA-Connected SoCs," Sonics, Inc., CoWare Arm Developer's Conference, Oct. 6, 2005, 39 pages.
Weber, Wolf-Dietrich, et. al., "A Quality-of-Service Mechanism for Interconnection Networks In System-on-Chips," 1530-1591/05, 2005 IEEE, 6 pages.
Casini, Phil, "Measuring the Value of Third Party Interconnects," Sonics, Inc., White Paper, 2005, 11 pages, www.sonicsinc.com.
European Search Report for International Application No. EP 02 71 3653, mailed on May 29, 2006, pp. 3 total.
First Exam Report for European Application No. 04796678.3 dated Dec. 11, 2006, 6 pages.
International Search Report for International Patent Application No. PCT/US2004/035863 dated Aug. 9, 2005, 7 pages.
International Preliminary Report on Patentability and Written Opinion for International Patent Application No. PCT/US2004/035863 dated May 1, 2006, 11 pages.

* cited by examiner

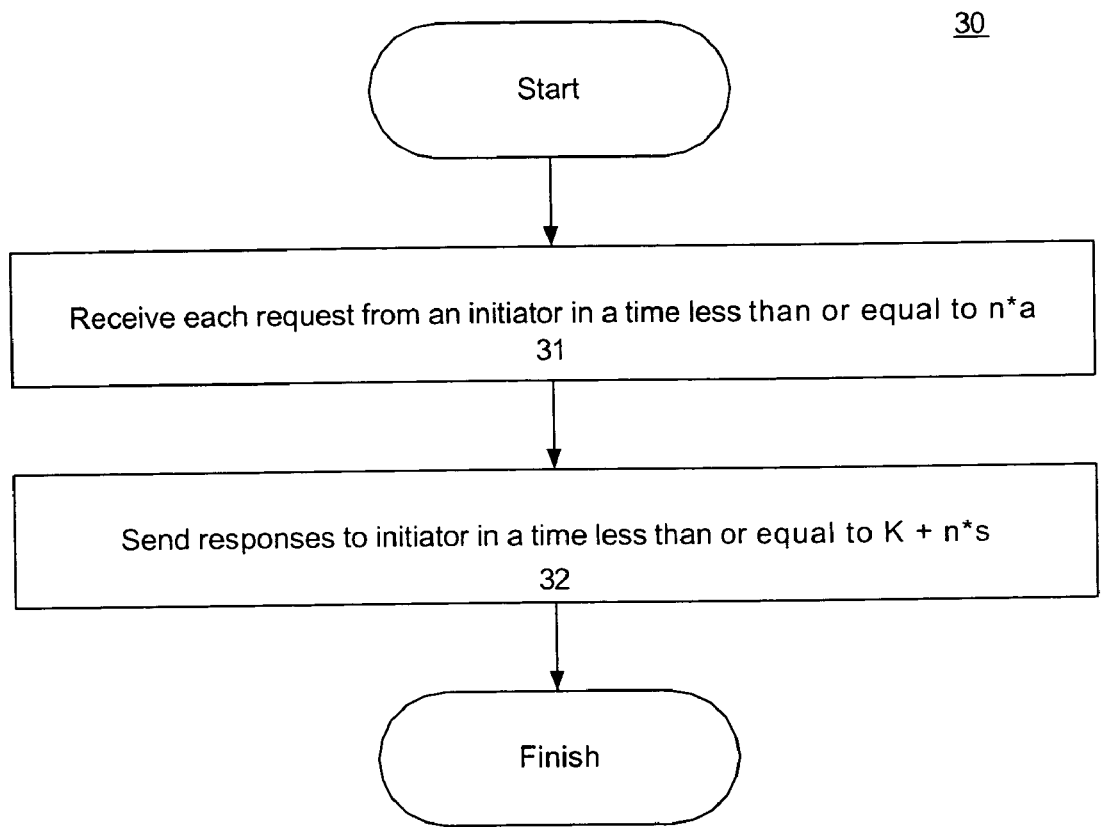

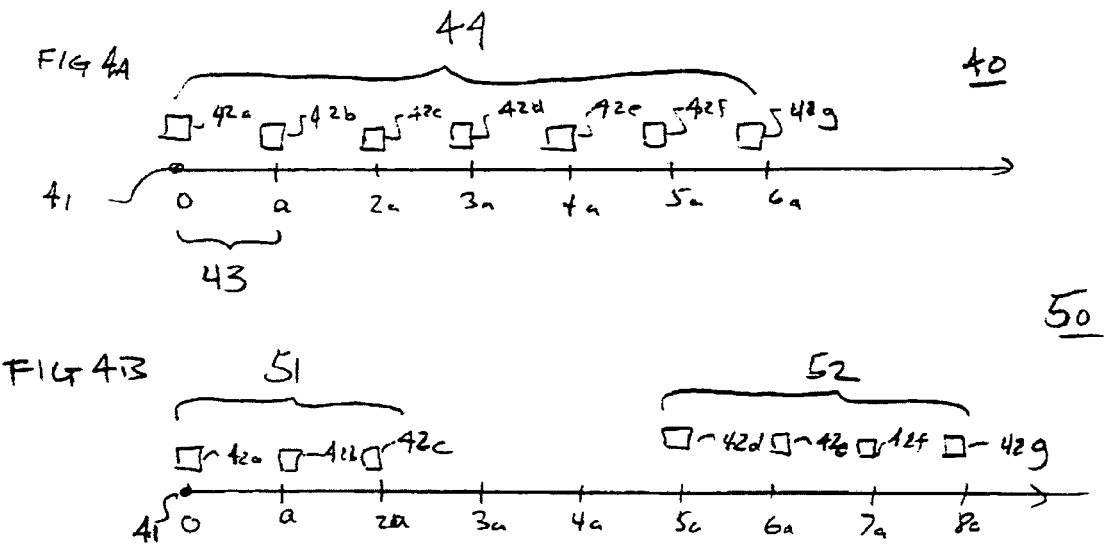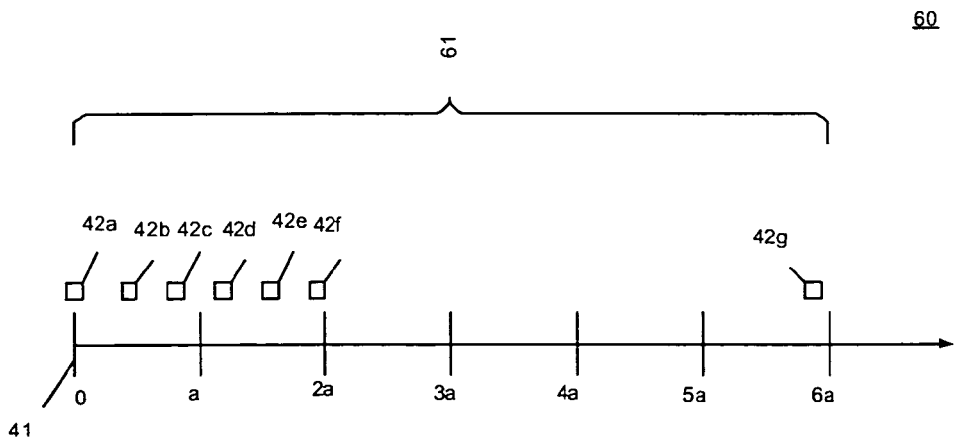
Figure 4C

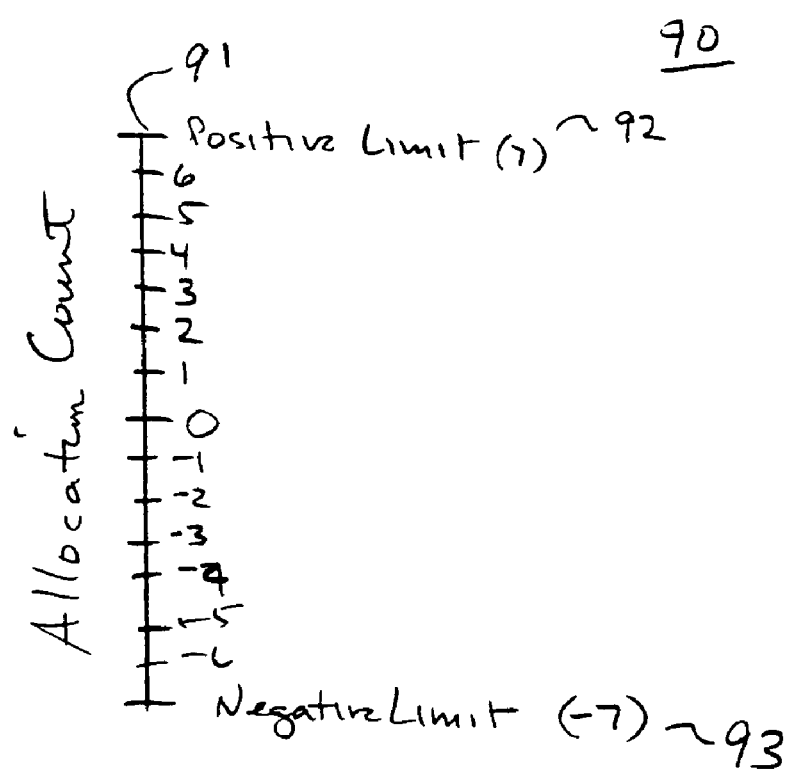

METHOD AND APPARATUS FOR ESTABLISHING A QUALITY OF SERVICE MODEL

FIELD OF THE INVENTION

The present invention generally relates to integrated systems and an aspect specifically relates to guaranteeing quality of service in integrated systems.

BACKGROUND

A System on a Chip (SoC) is an Integrated Circuit (IC) incorporating most or all of the necessary electronic circuits and parts for a system such as a cellular telephone, digital camera, Set Top Box (STB), etc. The SoC may incorporate several circuits that might otherwise be on individual chips, such as a central processing unit (CPU), direct memory access (DMA) unit, memory, input/output (I/O) circuitry, and other circuits required by the specific application. By including all of the circuitry required for a specific application on one IC, production costs for the system and the size of the system can be reduced, and the reliability of the system can be improved.

A SoC is a single chip including several interacting entities. The entities may be referred to as Intellectual Property (IP) cores, since they are generally licensed from other vendors, rather than produced by the manufacturer of the SoC. Initiators, such as a CPU, issue requests to targets, such as a memory, for service. For example, a CPU may need access to a portion of a memory. The CPU would issue a request to the memory for the specific data. The memory would then service the request and return the requested data to the CPU. The initiators and targets are connected through interconnects.

Quality of Service (QoS) may refer to an expectation of performance in terms of how quickly requests are served. For example, an initiator can issue a request, and can expect those requests to be satisfied by the target within a specific time. Performance may be specified in several different ways. Bandwidth performance refers to receiving a certain number of requests per unit time. Latency performance refers to the time for a certain request to be returned. Jitter performance refers to a variation in the time between requests or responses arriving.

QoS standards are especially important when using a SoC because initiators used in SoCs typically have very tight service requirements. For example, some initiators (such as CPUs), have tight latency requirements, and need to be served quickly. Other initiators (such as communication interfaces) are more sensitive to bandwidth and jitter performance. Some SoC's suffer from a QoS model that cannot ensure that certain performance guarantees are met in the SoC.

BRIEF DESCRIPTION OF THE DRAWINGS

FIG. 3 is a flow chart describing a QoS model according to one embodiment of the invention.

FIGS. 4A-C illustrate an arrival model according to one embodiment of the invention.

FIG. 6 illustrates an allocation count according to an embodiment of the present invention.

SUMMARY

Figure 1:
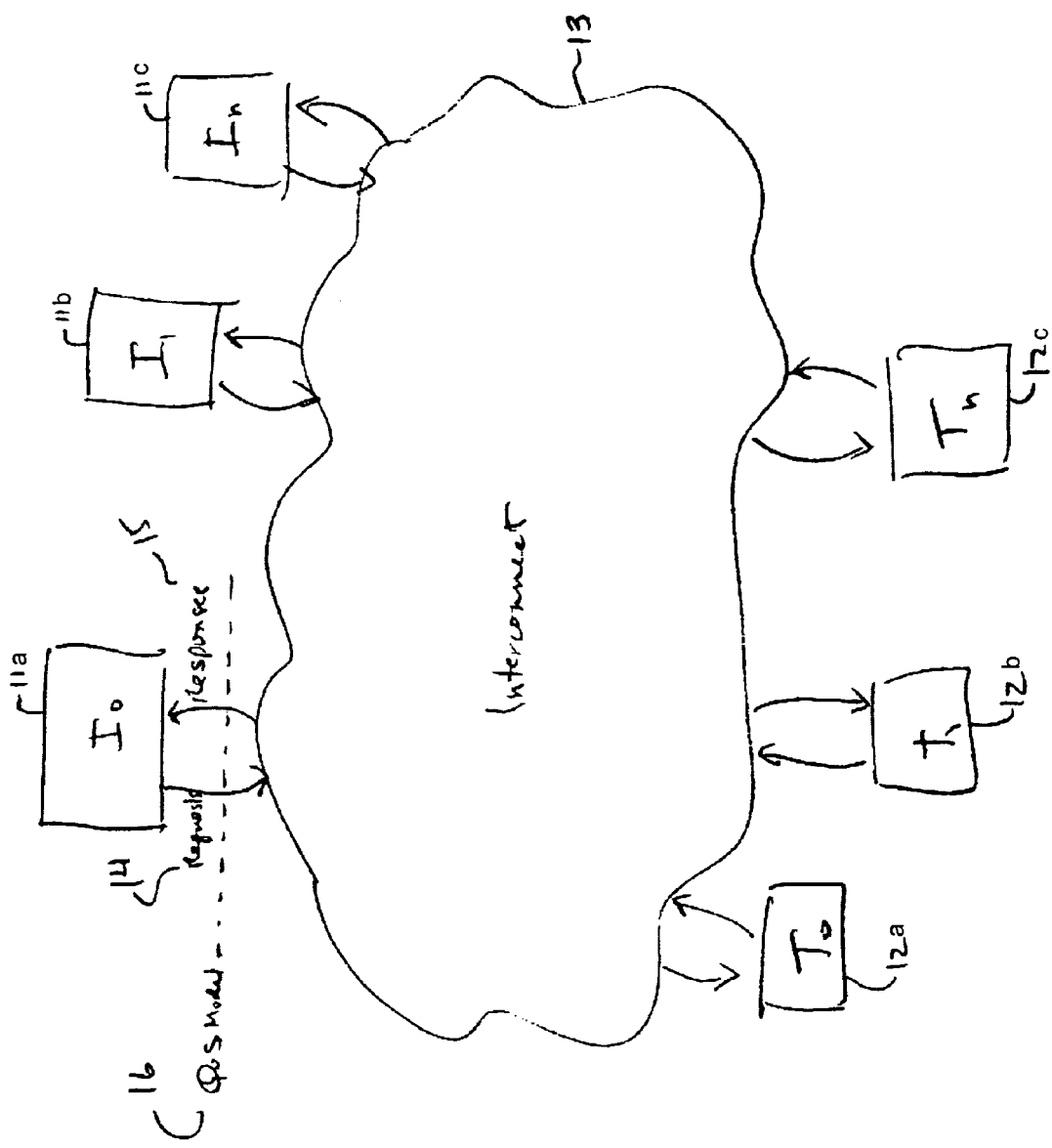
FIG. 1 illustrates an example System on a Chip according to one embodiment of the invention.

A method and an apparatus for a Quality of Service (QoS) model are disclosed. According to the QoS model, a request is received from an initiator in a first time less than or equal to one less than an ordinal number times an arrival interval, where the ordinal number signifies a position of the request among a group of requests. Also according to the model, the request that has been serviced is returned to the initiator in a second time less than or equal to a constant term plus the ordinal number times a service interval.

DETAILED DESCRIPTION

In the following description, numerous specific details are set forth, such as examples of named components, connections, number of requests in a group, etc., in order to provide a thorough understanding of the present invention. It will be apparent, however, to one skilled in the art that the present invention may be practiced without these specific details. In other instances, well-known components or methods have not been described in detail but rather as a block diagram to avoid unnecessarily obscuring the present invention. Thus, the specific details set forth are merely exemplary. The specific details may be varied from and still be contemplated to be within the spirit and scope of the present invention.

In general, methods and apparatus for implementing a Quality of Service (QoS) model are disclosed. According to an embodiment of the invention, the QoS model may be implemented on a System on a Chip (SoC) or other system where it is necessary to guarantee service between an initiator and a target. Initiators and targets are connected through an interconnect. An initiator, such as a Central Processing Unit (CPU) can request service from a target, such as a Random Access Memory (RAM). A thread is a channel to send requests from an initiator to a target. The interconnect, guided by a QoS unit, determines which threads will be serviced by the target. According to the QoS model, a contract may be established between an initiator and the rest of the system. According to the contract, the initiator guarantees that certain requests will arrive by certain deadlines, and the rest of the system guarantees that those requests will be serviced by other deadlines. The QoS model comprises an arrival model and a service model. The arrival model describes deadlines for receiving requests from the initiator, and the service model describes deadlines for receiving service from the target and the interconnect. According to the arrival model, requests from the initiator must arrive before a time $n*a$, where 'n' is the number of the request after the first request, and 'a' is a predetermined arrival interval. According to the service model, responses are issued in a time less than $K+n*s$, where 'K' is a predetermined constant term, and 's' is a predetermined service interval.

According to another embodiment, an allocation count is maintained for certain threads. The allocation count may track whether a specific thread is being serviced. The allocation count may increment at a regular interval, and decrement when the thread is serviced. The allocation count can be used to determine which threads will be serviced. This determination could be based upon whether the allocation count is currently positive. The allocation count may have a positive limit to ensure that an idle thread is not given too much priority. The positive limit may also be adjustable to insure that a lower priority bandwidth-allocated thread that is not serviced because a higher priority claim is being serviced will eventually receive its allocation.

FIG. 1 illustrates an example System on a Chip according to one embodiment of the invention. The SoC 10 includes several initiators 11 coupled to several targets 12 through an interconnect 13. Several initiators 11a, 11b, and 11c are shown. A reference simply to an initiator 11 indicates that any of the initiators 11a-c may apply in that instance. The same holds true for the targets 12a-c, and etc. The initiators 11 may include devices such as CPUs, Direct Memory Access units (DMAs), graphics systems, audio systems, etc. The targets may include devices such as memories including cache memories, Random Access Memories (RAMs), Read Only Memories (ROMs), peripherals, DMA units, register programming interfaces, etc. The initiators 11 generally require service by the targets 12. The interconnect 13 links the various initiators 11 to the various targets 12. Generally, any initiator 11 can request service from any target 12.

An initiator 11 communicates with a target 12 by issuing requests 14 and receiving responses 15 to and from the interconnect 13. A request 14 may be, for example, a memory read request. The corresponding response 15 would then be data satisfying that request. By sending the response to the requesting initiator 11, the requested target 12 is said to have "serviced" the request. A QoS model describes a contract between an initiator 11 and the rest of the system at the boundary 16 between the specific initiator 11 and the interconnect 13. The QoS model specifies deadlines for receiving requests from the initiator 11 and deadlines for returning responses to the initiator 11.

Figure 2:
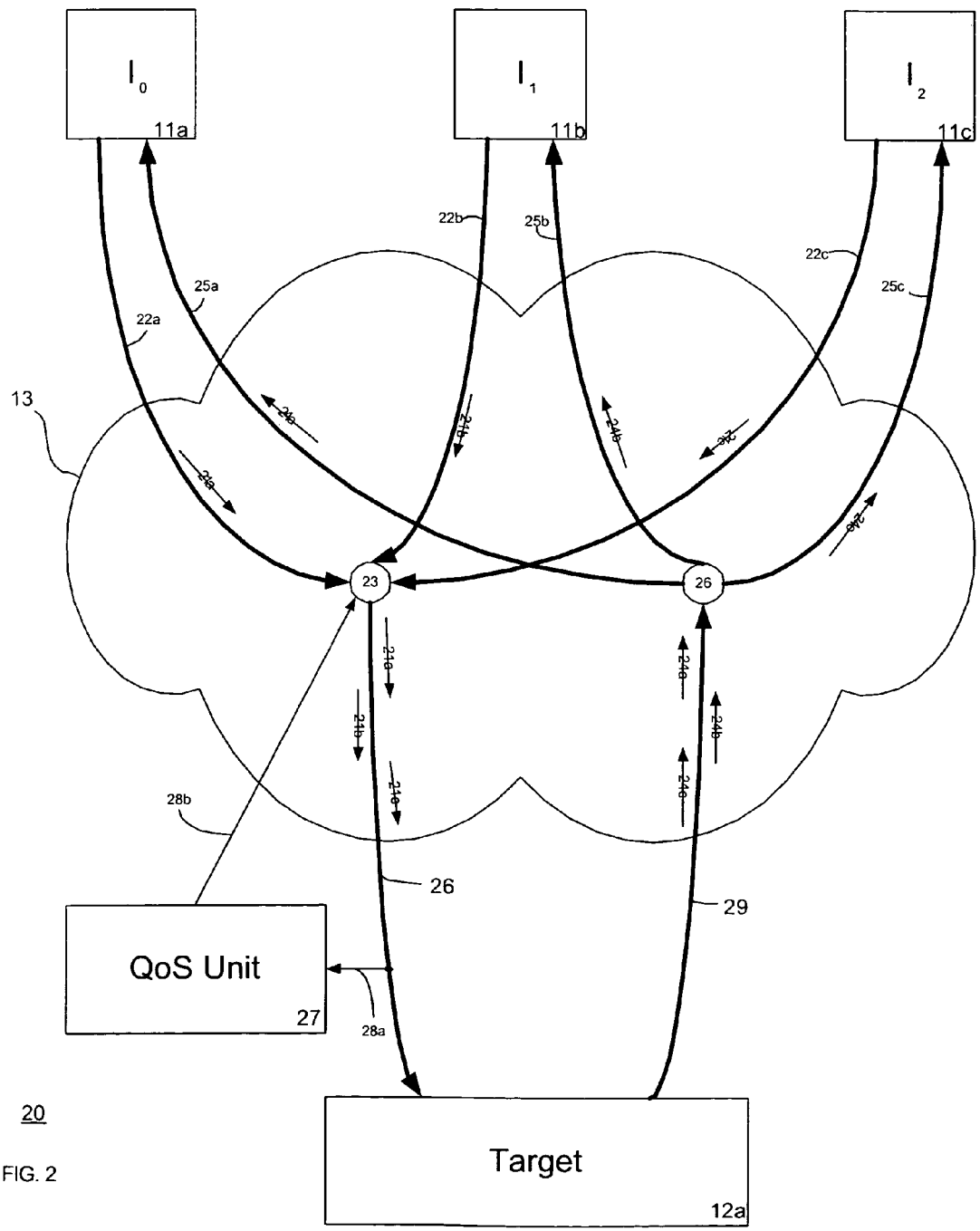
FIG. 2 illustrates a system for implementing a QoS model according to an embodiment of the invention.

FIG. 2 illustrates a system for implementing a QoS model according to an embodiment of the invention. The system 20 may be a SoC or other system requiring QoS management. Several initiators 11a-c are communicating with a target 12a. Although the target 12a is specified here, it is understood that any target 12 may be used. The initiators 11a-c issue groups of requests that are to be serviced by the target 12a. Each initiator 11a-c issues requests on one or more threads 21a-c. A thread 21 is virtual channel established over a physical channel 22. As shown here, each initiator 11a-c has its own dedicated physical channel 22a-c that corresponds to that initiator 11a-c. Several threads may be multiplexed on the same physical channel 22. Requests from different threads are received at one or more arbitration points 23 inside the interconnect 13. The arbitration point 23 may be specific to the target 12a. In another embodiment, the arbitration point 23 may serve several different targets 12. The arbitration point 23 determines when, and in which order, requests are presented to the target 12a, and the target 12a determines its service timing, and in a multi-threaded case, some of the service ordering. When the requests have been serviced, they are returned to the initiators 11 as threads of responses 24a-c along the return channels 25a-c. The responses have been serviced by the target 12a, and are directed back to the original initiator 11 by the split point 26.

Several threads are shown on the physical channels 22 and 25. The threads 21a-c are request threads from the initiators 11a-c which are virtual channels carrying requests from the initiators 11a-c. Although they are only shown on a portion of the physical channels 22, the threads 21 "virtually" extend the length of the physical channels 22. Likewise, the response threads 24 are virtual channels along the physical response channels 25. A request channel 26 sends requests from the interconnect 13 to the target 12a. The request channel 26 is also observed by a QoS unit 27. The QoS unit 27 is coupled to the request channel through a channel 28a, and to the arbitration point 23 through the channel 28b. A response channel 29 sends responses from the QoS unit to the interconnect 13. As can be seen, the threads 21a, 21b, and 21c are multiplexed on the request channel 26. Likewise, the threads 24a, 24b, and 24c are multiplexed on the response channel 29.

The QoS unit 27 issues instructions to the interconnect 13 through the channel 28b. The QoS unit 27 could be inside the target 12a, inside the interconnect 13, or, as shown, independent. The interconnect 13 ultimately decides which request is issued to the target 12a, but the QoS unit 27 guides the interconnect 13 according to the contract and the QoS model. For each thread 21, the QoS unit 27 determines when the threads 21 will be presented to the target 12a for service according to the various contracts with the different initiators 11. The QoS unit 27, target 12a, and interconnect 13 together satisfy the requirements of the QoS contracts. The specifics of these contracts will be discussed below.

FIG. 3 is a flow chart describing a QoS model according to one embodiment of the invention. In one embodiment the QoS unit 27, the interconnect 13, and the targets 12 implement the process 30. Block 31 describes an arrival model. In block 31, a group of requests is received from an initiator. Each request, according to the QoS model, is received at a time less than or equal to n*a, where n is an ordinal number describing the number of the request after the first request. For example, n is 0 for the first request, 1 for the second request, etc. The variable a refers to an arrival interval, which is a predetermined time that refers to the system's accepted interval for request arrivals. According to this model, a group of seven requests arrives before a time 6a after the first request arrives. Each request in the group can arrive at a time n*a after the first request, however the request may also arrive at any time before. For example, the second request can arrive any time after the first request and before a, the third request any time after the second request and before 2a, etc. The model establishes a deadline at or before which each request must arrive. The arrival interval a may be fixed by the system or variable, depending on the application. It is understood that a first logic can determine whether the arrival model is satisfied.

Block 32 describes a service model. In block 32, a response is sent to the initiator in a time less than or equal to K+n*s. The K term is a constant term that covers such quantities as the latency and jitter of service. The K term is added to each group, and gives a target servicing the group more latitude to schedule other groups that may have higher priority or to lead to higher overall system efficiency. The s variable is a service interval that is analogous to the a variable. The K and s terms can be fixed for a specific system, or may change depending on the initiator 11, the target 12, etc. It is understood that a logic, including the target 12, the interconnect 13, and the QoS unit 27 can satisfy the service model once it is determined that the arrival model has been satisfied.

The QoS model comprises two parts: an arrival model and a service model. FIGS. 4A-C illustrate an arrival model according to one embodiment of the invention. FIG. 4A illustrates a group of requests according to an arrival model 40. The arrival model 40 includes a time line 41 to indicate when the requests 42 are received. The group of requests 44 includes several individual requests 42. The model 40 includes a series of deadlines by which the requests 42 should be received in order to satisfy the contract. The request interval 43 or a signifies a deadline by which time the request should be received by the rest of the system. For each request in the group, the request must arrive before a time established by the following equation:

$$n*a$$

where n corresponds to the number in sequence after the first request in the group (e.g., the third request 42c has an n=2). The arrival time of the first response may be defined as time 0.

A group of requests 44 comprising the requests 42a-g may be sent by the initiator 11 to the interconnect 13. The initiator 11 issues a group of requests 44 to a single target 12. According to the QoS contract, the entire group of requests 44 is received by the rest of the system in a time less than or equal to one less than the number of requests in the group times the request interval a 43. Each individual request is received before a times one less than the number of the specific request. For example, the second request 42b is received before a time 1a, and the third request 42c is received before a time 2a. As can be seen, each individual request in the group 44 arrives in a time less than or equal to n*a, and the QoS arrival model is satisfied for the group of requests 44. It can be further seen that each individual request in the group 44 arrives just before its arrival deadline n*a. Such behavior is characteristic of isochronous data production processes, which are common in applications such as telecommunications and streaming media.

FIG. 4B illustrates two request groups. The request group 44 has been divided into two request groups 51 and 52, which may be necessary because requests 42d-g do not satisfy the arrival model when grouped with 42a-c. The request group 51 comprises the requests 42a-c, and the request group 52 comprises the requests 42d-g. In order to satisfy the arrival model, the request 42c must arrive before 2a after the request 42a arrives. Likewise, in order to satisfy the arrival model, the request 42g must arrive before 2a after the request 42d arrives.

FIG. 4C illustrates a received request group. The request group 61 comprises the requests 42a-g. According to the QoS model, the request 42b must arrive before time a, the request 42c must arrive before time 2a, etc. As can be seen in FIG. 4C, the request 42f is received before the time 2a, even though the deadline for receiving the request 42f is time 5a. The model 60 illustrates that an initiator 11 is free to send requests early. The request 4g is received before the time 6a. As can be seen there is a large gap between the time that the sixth request 42f and the seventh request 42g are received. However, since the requests 42a-g are all received according to the QoS model, the initiator 11 has satisfied the contract.

Figure 5A:
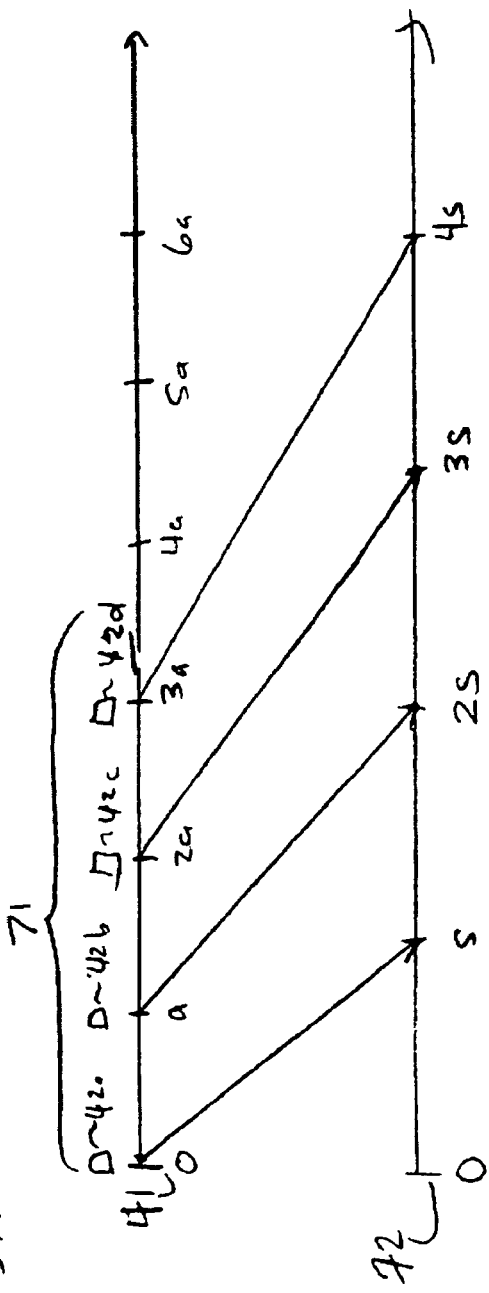
FIGS. 5A and 5B illustrate a service model according to one embodiment of the invention.
Figure 5B:
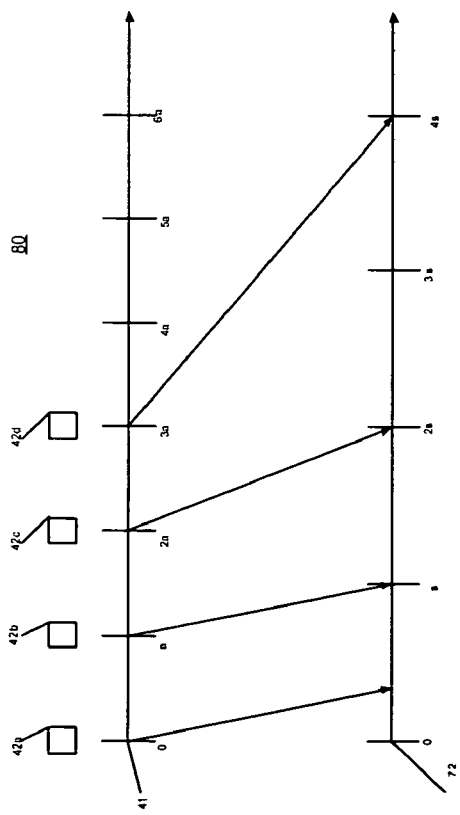

FIGS. 5A and 5B illustrate a service model according to one embodiment of the invention. According to FIG. 5A, the service model 70 includes the group of requests 71 including the requests 42a-d. According to the arrival model, the group 71 is to be received before the time 3a. The timeline 72 shows the time at which specific requests are serviced. According to the service model, a group of requests must be serviced before a time equal to:

$$K+n*s$$

where K is a constant term and s is the service interval. The K term is a term included in the contract, and applies to each group of requests. The K term gives the target 12 extra time to service the group 71. The target 12 may divide up the K term as it wishes when servicing the request group 71. The K term could be an initial latency term, or can be used by the QoS unit 27 however it desires. The K term can be used, for example, to give the target 12 more time to service a request from another initiator 11. In one embodiment, the service interval s is a time that is greater than or equal to the arrival interval a. Since the requests cannot be serviced until they have arrived, the service interval s is necessarily greater than or equal to the arrival interval a. If a is less than s, the service model behaves as though a were equal to s. In one embodiment, it is desirable to have a and s equal. The service interval s may also be thought of as a nominal bandwidth term. In this example, the K term is equal to the service interval s, for simplicity. However, it is understood that any K term can be chosen independent of the service interval s. Also, the service term is given an arbitrary value of s=1.5a in this example.

According to the service model, the entire group 71, which comprises four requests, must be serviced by the time equal to K+n*s, which is s+3*s=4s (or 6a). Remembering that the K term is assigned a value of s in this example, the first request 42a must be serviced by the time s, since s+0*s=s. Likewise, the second request 42b must be serviced by the time 2s, since s+1*s=2s. The interconnect 13 and target 12 has used the K term here to delay the servicing of the first request 42a. As can be seen in FIG. 5A, the group 71 has been serviced according to the model, since each request is received before its respective deadline.

FIG. 5B illustrates an alternative servicing of the group 71. In this example 80, remembering that K has a value of s, the first and second requests 42a and 42b are serviced before the time s. The third request 42c is serviced at 2s, and the fourth request 42d is not serviced until 4s. The fourth and last request does not need to be serviced until 4s according to the model, and since the target 12 has serviced the first three requests 42a-c early, the target 12 is free to service other requests as long as the final request 42d is serviced before a time 4s. As can be seen in FIG. 5B, the group 71 has been serviced according to the model.

FIG. 6 illustrates an allocation count according to an embodiment of the present invention. An allocation count 90 can be maintained in the QoS unit 27 for each thread. The allocation count 90 generally measures whether or not a specific thread is being serviced. In one embodiment, there are three types of threads: 1) high-priority threads which are given priority for service over all other threads as long as they stay within a pre-allocated portion of the target's 12 bandwidth, 2) bandwidth allocation threads which are generally guaranteed a portion of a target's 12 bandwidth, and 3) best effort threads, which are serviced whenever the target 12 has extra bandwidth to do so. Allocated bandwidth and priority threads are monitored using the allocation count 90. The allocation meter 91 is an illustration of the number of credits issued to a specific thread. The allocation meter 91 has a positive limit 92 and a negative limit 93. These limits are explained below.

The allocation count 90 can be used to determine a priority between threads that are subject to bandwidth allocation (i.e. high-priority and bandwidth allocation threads). Generally, if a thread is not being serviced, often because a high-priority thread has required the service of a specific target 12, the allocation count 90 will become increasingly positive. Conversely, if a thread has received more service than it was allocated, its allocation count will become negative. A negative allocation count 90 can be used to demote the priority of that thread, giving other threads a better chance of receiving service.

At a regular interval, the allocation count 90 is incremented. For example, at time 0 the allocation count 90 for a specific thread is 0. At time t, the thread is issued one credit. Therefore, if the thread has not requested service, the allocation count 90 goes positive, to a count of +1. When the thread receives service, a credit is debited. For example, at time t, if the thread requests service once, the allocation count 90 for the thread will be 0, since the thread has received one credit at the time t (its regular credit), and has had that credit debited by having its request fulfilled. It is possible for the allocation count to go negative. For example, if at time t, a thread has already requested service twice, the thread will merely have received one credit, and will have two credits debited, resulting in an allocation count 90 of −1.

The allocation count 90 has a positive 92 and a negative 93 limit. As shown here, the positive limit 92 is +7 credits, and the negative limit 93 is −7 credits. If a thread is idle for a long time, the thread will accumulate an excess of credits. As a result, even with the thread resuming requests for service, the allocation count 90 may never return to zero, and the specific thread may always be serviced. For this reason, the positive limit 92 is established. A large positive limit makes it difficult to honor the QoS contract of other initiators 11, while a QoS model using a small positive limit may not be capable of handling request arrival jitter introduced by the interconnect 13. Further, a higher positive limit may be warranted where the QoS scheme and target behavior introduce service jitter. Hence the need for the dynamic adjustment of the positive limit.

A negative limit 93 is also established. The negative limit 93 protects a thread from having too many requests serviced and exceeding its allocated bandwidth by too much. If this is the case, the thread may not receive service for a long period of time because it is constantly being demoted as a result of its negative allocation count 90. The negative limit 93 thus reduces service jitter.

Figure 7:
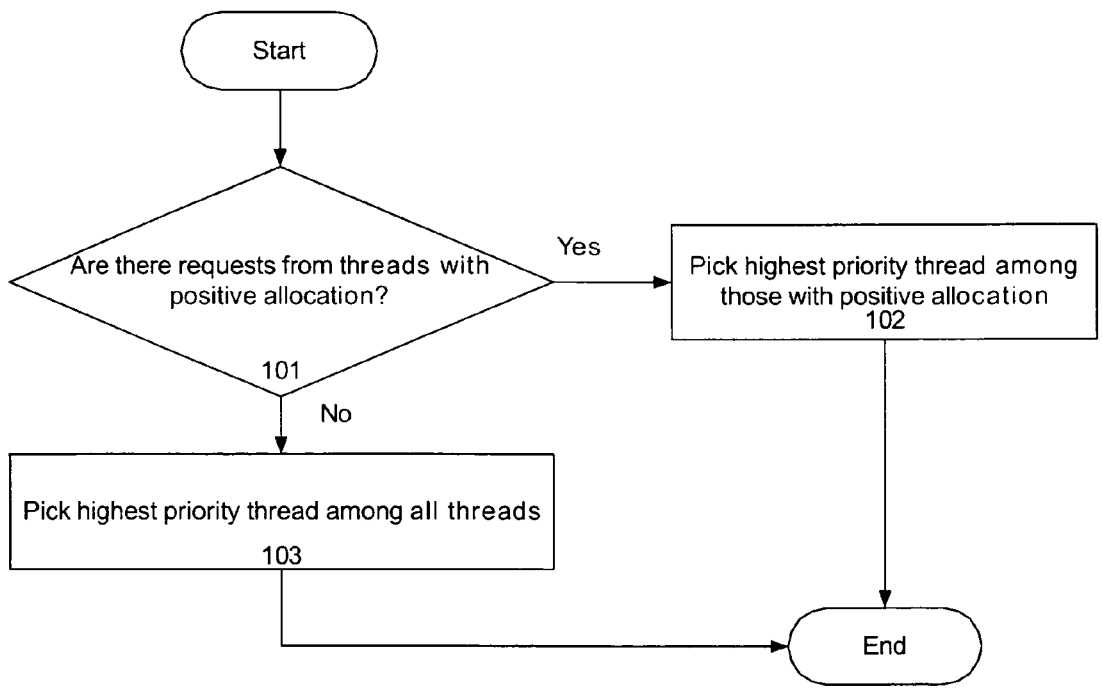
FIG. 7 is a flow chart illustrating using an allocation count to establish priority for specific threads.

FIG. 7 is a flow chart illustrating using an allocation count 90 to establish priority for specific threads. The process 100 explains awarding priority to specific threads. This priority may be used to determine when a target 12 will service a thread 21. In block 101, it is determined whether there are requests from threads having positive allocation. The positive allocation is determined and accumulated using the technique described relating to the allocation count 90. If threads with a positive allocation are found, in block 102, the highest priority thread among those with positive allocation is chosen. According to one embodiment, the highest priority thread may be a thread that is a high-priority thread or a thread having the most positive allocation count 90. According to other embodiments, other priority systems may be established.

In block 103, if there are no threads having positive allocation, the highest priority thread is chosen to be serviced. As above, the priority may be determined using different techniques, including awarding service to a thread having a high-priority designation. The allocation priority may be implemented in the QoS unit 27. Once the QoS unit 27 has determined the thread having the highest priority, that thread is serviced. The process may continue for future service.

Figure 8:
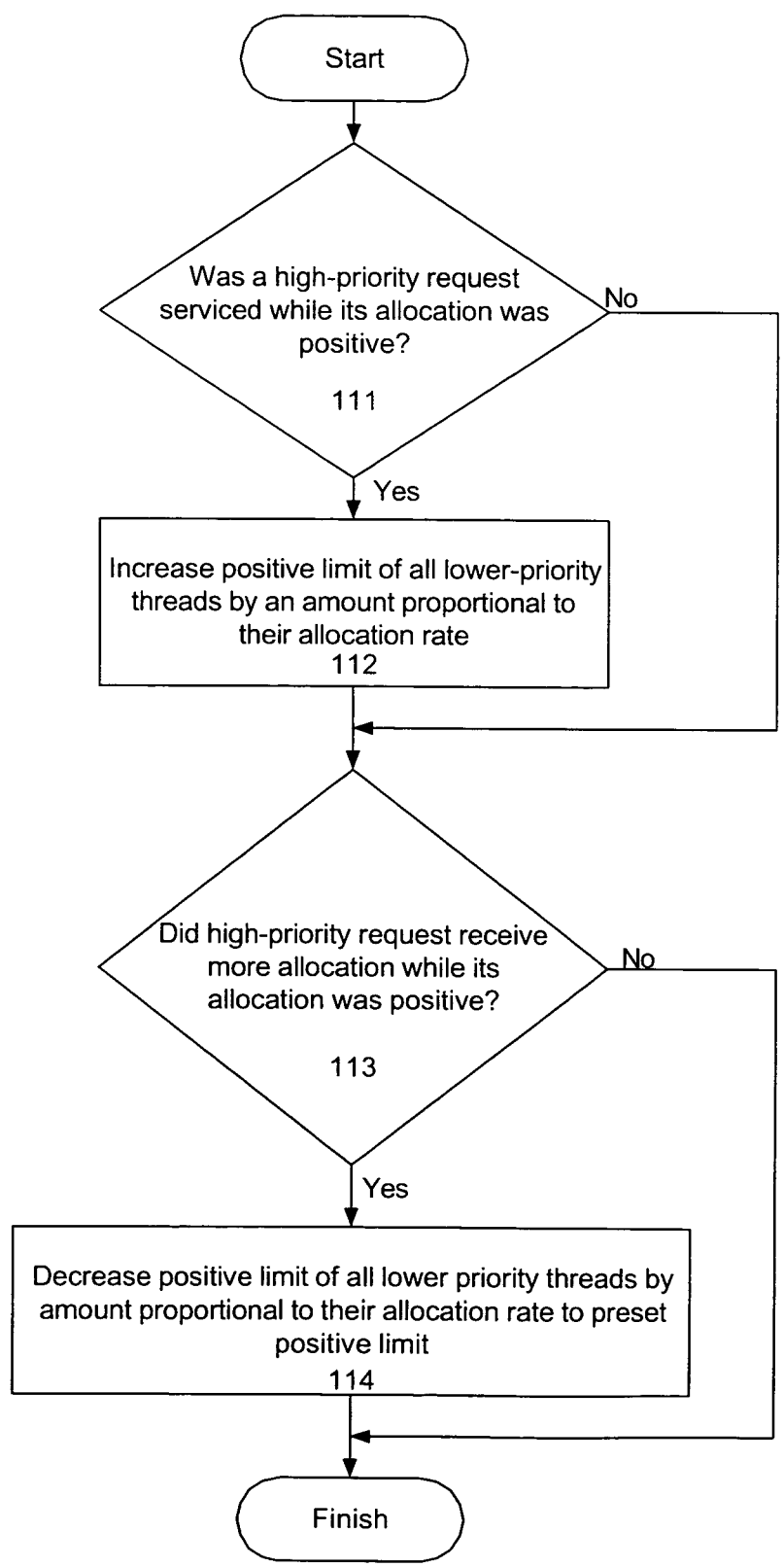
FIG. 8 is a flow chart describing the operation of an allocation count using an adjustable positive limit.

FIG. 8 is a flow chart describing the operation of an allocation count using an adjustable positive limit. The positive limit 92 may need to be adjusted if, for example, a high-priority thread is monopolizing a target 12. A bandwidth allocation thread that needs access to the target 12 may be left waiting for a long period of time because of the high-priority thread. Eventually, the allocation count 90 for the bandwidth allocation thread would reach the positive limit 92. However, the bandwidth allocation thread has still not been serviced. It may be desirable in some instances to dynamically raise the limit 92 in such a situation, because if the limit is left constant, in some instances the QoS contract may not be satisfied.

The process 110 may be exercised each time a request is to be serviced by a target 12. In block 111, it is determined whether a high-priority request from a high priority thread was serviced while its allocation was positive. If a request was serviced from a high-priority thread, in block 112, the positive limit 92 of all lower-priority threads is increased by an amount proportional to their allocation rate. For example, if a bandwidth allocation thread has an allocation rate of 50% (i.e., the thread is allocated 50% of the specific target's 12 bandwidth), the limit 92 is raised by 50% of the credit consumed by the high-priority thread. For example, the positive limit 92, in one embodiment, may be 6. Where the high-priority thread consumed two credits, the limit would be raised to 7. Returning to block 111, if no high-priority request was serviced, the process 110 advances to block 113.

In block 113, it is determined whether a high-priority request received more allocation while its allocation count was positive. If the high-priority thread's allocation count increased while it had a positive allocation count, this is an indication that the higher-priority thread is not requesting service. Since the higher-priority thread is not requesting service, the lower-priority thread can receive service, thus decreasing its allocation count 90. Either the lower-priority thread is being serviced or not requesting service, but in either case the positive limit 92 should be returned to normal in block 114 to avoid giving priority to a thread that does not need it.

This invention has been described with reference to specific embodiments. It will, however, be evident to persons skilled in the art having the benefit of this disclosure that various modifications and changes may be made to these embodiments without departing from the broader spirit and scope of the invention. The specification and drawings are accordingly to be regarded in an illustrative rather than restrictive sense.

What is claimed is:

1. A method for satisfying a Quality of Service (QoS) contract with an initiator in an Integrated Circuit, comprising:
   receiving a request from the initiator in the Integrated Circuit in a first time less than or equal to an ordinal number times an arrival interval to satisfy an arrival model, wherein the ordinal number signifies a position of the request among a group of requests;
   returning the request from the initiator that has been serviced by a target to the initiator in a second time less than or equal to a constant term plus the ordinal number times a service interval to satisfy a service model; and
   measuring the first and second time at a boundary between the initiator and an interconnect in the Integrated Circuit.

2. The method of claim 1, further comprising:
   determining whether the arrival model and the service model have been satisfied in order to satisfy the QoS contract.

3. The method of claim 1, further comprising:
   satisfying the QoS contract using the initiator, a target, the interconnect, and a QoS unit that are all located on a chip.

4. The method of claim 3, wherein the service interval is greater than the arrival interval.

5. The method of claim 1, wherein the service interval is equal to the arrival interval.

6. The method of claim 1, further comprising:
   determining the constant term specifically for the group of requests.

7. The method of claim 6, wherein the arrival interval is a predetermined accepted interval for requested arrivals.

8. A system, comprising:
   an interconnect coupled between an initiator and a target, wherein an arrival model is satisfied by the initiator if a request arrives before a first time less than or equal to an ordinal number times an arrival interval, wherein the ordinal number signifies a position of the request among a group of requests;

a Quality of Service (QoS) logic unit coupled to the interconnect and is configured to satisfy a service model if the initiator satisfies the arrival model, wherein the logic unit satisfies the service model if the request is serviced before a second time less than or equal to a constant term plus the ordinal number times a service interval; and wherein the Quality of Service (QoS) logic unit is configured to satisfy a QoS contract and is located at a boundary between the initiator and the interconnect and the QoS contract is based on the arrival model and the service model being satisfied.

9. The system of claim 8, wherein the service interval is greater than the arrival interval.

10. The system of claim 8, wherein the constant term is determined specifically for the group of requests.

11. The system of claim 10, wherein the QoS unit is coupled between the target and the interconnect.

12. The method of claim 8, wherein the QoS contract is satisfied using the initiator, the target, the interconnect, and the logic that are all located on a chip.

13. The system of claim 12, wherein the QoS unit is part of the interconnect.

14. The system of claim 8, wherein the QoS unit is part of the target.

15. A method for tracking service for two or more threads in an Integrated Circuit, comprising:

maintaining a first allocation count for a first thread to track whether the first thread is being serviced by a target in the Integrated Circuit, wherein the first thread is a bandwidth allocation thread;

establishing an adjustable positive limit having a first value for the first allocation count that establishes an initial maximum amount the first allocation count may go up to;

raising the adjustable positive limit for the first allocation count to a second value when the first value for the first allocation count has been reached and the first thread has yet to have a request fulfilled from the target during a regular interval of time;

satisfying a service model if an arrival model is satisfied by an initiator if a request arrives before a first time less than or equal to an ordinal number times an arrival interval, wherein the ordinal number signifies a position of the request among a group of requests; and wherein the service model is satisfied if the request is serviced before a second time less than or equal to a constant term plus the ordinal number times a service interval.

16. The method of claim 15, further comprising:
reducing the positive limit from the second value to a third value for the first allocation count at a time when a second allocation count receives a credit and is positive.

17. The method of claim 16, wherein the positive limit is not reduced below the first value.

18. The method of claim 15, further comprising:
crediting the first and second allocation count at a regular interval;

debiting the first allocation count when the first thread is serviced; and debiting the second allocation count when a second thread is serviced; and establishing a negative limit having a fourth value for the first allocation count.

19. The method of claim 15, wherein raising comprises increasing the positive limit by an amount proportional to an allocation rate of the first thread.

20. The method of claim 19, wherein the amount proportional to the allocation rate of the first thread comprises a number of times the second thread was serviced by the target during the regular interval of time multiplied by the allocation rate of the first thread.

21. The method of claim 18, further comprising:
determining whether the first thread will be serviced according to the first allocation count.

22. The method of claim 21, further comprising:
servicing the first thread instead of the second thread when the second allocation count is less than the first allocation count.

23. The method of claim 15, wherein the second thread is a high-priority thread.

24. The method of claim 23, wherein the first thread is a bandwidth-allocation thread.

25. A system, comprising:
an interconnect coupled to an initiator and a target;
a first logic coupled to the interconnect, and configured to maintain a first allocation count for a first thread from the initiator to track bandwidth usage by the first thread;
a second logic coupled to the first logic, and configured to establish an adjustable positive limit having a first value for the first allocation count that establishes an initial maximum amount the first allocation count may go up to; and
a third logic coupled to the second logic, and configured to raise the adjustable positive limit from the first value to a second value when the first value for the first allocation count has been reached, then the first thread has not been service during a predetermined interval of time, and the first thread has one or more requests waiting to be serviced from the target, wherein the first thread is a bandwidth allocation thread;
an arrival model logic coupled to the interconnect and the first logic, the an arrival model logic is configured to satisfy a service model if an arrival model is satisfied by the initiator if a request arrives before a first time less than or equal to an ordinal number times an arrival interval, wherein the ordinal number signifies a position of the request among a group of requests; and
wherein the service model is satisfied if the request is serviced before a second time less than or equal to a constant term plus the ordinal number times a service interval.

26. The system of claim 25, further comprising:
a fourth logic coupled to the second logic, and configured to reduce the raised adjustable positive limit to a third value when a second allocation count receives a credit and is positive.

27. The system of claim 25, wherein the positive limit is raised by an amount proportional to an allocation rate of the first thread.

* * * * *

UNITED STATES PATENT AND TRADEMARK OFFICE
CERTIFICATE OF CORRECTION

PATENT NO.        : 7,665,069 B2                                    Page 1 of 1
APPLICATION NO.   : 10/698905
DATED             : February 16, 2010
INVENTOR(S)       : Wolf-Dietrich Weber It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1873 days.

Signed and Sealed this

Seventh Day of December, 2010

David J. Kappos
*Director of the United States Patent and Trademark Office*